(12) United States Patent
Kosanke

(10) Patent No.: US 7,882,808 B2
(45) Date of Patent: Feb. 8, 2011

(54) PROTECTIVE HEN APRON

(75) Inventor: Tobi Kosanke, Hempstead, TX (US)

(73) Assignee: Crazy K Poultry + Livestock, LLC, Hempstead, TX (US)

( * ) Notice: Subject to any disclaimer, the term of this patent is extended or adjusted under 35 U.S.C. 154(b) by 66 days.

(21) Appl. No.: 12/356,203

(22) Filed: Jan. 20, 2009

(65) Prior Publication Data

US 2010/0043726 A1 Feb. 25, 2010

Related U.S. Application Data

(60) Provisional application No. 61/090,489, filed on Aug. 20, 2008.

(51) Int. Cl.
*A01K 13/00* (2006.01)
(52) U.S. Cl. .................................. 119/853; 119/855
(58) Field of Classification Search ................ 119/853, 119/850, 854, 713, 714, 715
See application file for complete search history.

(56) References Cited

U.S. PATENT DOCUMENTS 2,006,118 A * 6/1935 Smith .......................... 119/853
2,090,871 A * 8/1937 Kennedy ...................... 119/853
2,751,884 A * 6/1956 Brown et al. ................. 119/853
2004/0211370 A1* 10/2004 Blommel ...................... 119/725

* cited by examiner

*Primary Examiner*—Timothy D Collins
*Assistant Examiner*—Joshua Huson
(74) *Attorney, Agent, or Firm*—Mayback & Hoffman, P.A.; Gregory L. Mayback

(57) ABSTRACT

A protective bird apron includes a main body area with a length and a width and a pair of opposing lateral sections attached to the main body area at corresponding opposing edges thereof, each lateral section having a length less than the length of the main body area and a width dimensioned to extend beneath respective wings of the bird. At least one securing strap is coupled to an upper portion of the main body area and to an upper portion of at least one of the lateral sections, the main body area, the at least one of the lateral sections, and the at least one securing strap defining at least one shoulder securing area. A shoulder protector is coupled to the back covering, disposed to protect shoulders of the bird, and has a width substantially the same or greater than a width of the back covering.

14 Claims, 4 Drawing Sheets

PROTECTIVE HEN APRON

FIELD OF THE INVENTION

The present invention relates generally to the protection of birds, and more particularly relates to an apron worn by hens or other birds to protect their backs from roosters during mating and from attacks from above by birds of prey.

BACKGROUND OF THE INVENTION

During mating with roosters, hens often sustain feather loss and cuts and gashes on their backs and shoulders. These injuries can lead to infection, picking, cannibalism, and death. In both backyard and commercial flocks, both hens and roosters often pick at each other, with the same dire results. Once a chicken suffers feather loss and wounds on its back, the chicken must either be removed from the flock or have its back covered to prevent further damage and possible infection.

Some protectors have been developed that establish a minimal level of protection for the chicken against injury. However, these devices fail to protect all of the susceptible areas of the hen's back.

The level of protection that is afforded will depend on the quality of the material and construction of the device. To date, no protector exists that meets the needs of chickens, including a proper fit for both less active (cooped or confined) and more active (free-ranging or pastured) chickens, accommodation of tail feathers, and protection of shoulders, without inhibiting the chicken's ability to spread its wings and fly.

A main predator of chickens in free-ranging or pastured flocks is the "chicken hawk." Although it may be impossible to completely protect a chicken from birds of prey, no current protector offers even a minimal level of protection.

Therefore, a need exists to overcome the problems with the prior art as discussed above.

SUMMARY OF THE INVENTION

Briefly, in accordance with the present invention, disclosed is a protective bird apron that includes a back covering with a main body area that has a length and a width. A first lateral section is attached to a first side of the main body area and has a length less than the length of the main body area and a width dimensioned to extend away from the main body area and beneath a first wing of the bird. A second lateral section is attached to a second side of the main body area opposite the first side and has a length less than the length of the main body area and a width dimensioned to extend away from the main body area and beneath a second wing of the bird. A first securing strap is coupled to an outer portion of the first lateral section and to the second side of the main body area, a second securing strap coupled to an outer portion of the second lateral section and to the first side of the main body area, the first and second securing straps defining a first wing capturing portion, a second wing capturing portion, and a neck capturing portion, and a shoulder protector coupled to the back covering, disposed to protect shoulders of the bird, and having a width substantially the same or greater than a width of the back covering.

In accordance with another feature, an embodiment of the present invention includes a neck-securing loop shaped to secure the shoulder protector to a neck of the bird.

In accordance with a further feature of the present invention, the shoulder protector is removably coupled to the back covering.

In accordance with yet another feature of the present invention, the back covering is of a first material and further comprises an interior layer insulating the back covering from the bird, the interior layer being of a second material different from the first material.

In accordance with an additional feature of the present invention, the shoulder protector is removably coupled to the back covering.

In accordance with a further feature, the present invention includes an inner layer disposed between the interior layer and the bird.

In accordance with another feature, an embodiment of the present invention also includes a substantially V-shaped lower edge shaped to accept a tail of the bird.

Although the invention is illustrated and described herein as embodied in a protective hen apron, it is, nevertheless, not intended to be limited to the details shown because various modifications and structural changes may be made therein without departing from the spirit of the invention and within the scope and range of equivalents of the claims. Additionally, well-known elements of exemplary embodiments of the invention sill not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary or the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

BRIEF DESCRIPTION OF THE DRAWINGS

The accompanying figures, where like reference numerals refer to identical or functionally similar elements throughout the separate views and which, together with the detailed description below, are incorporated in and form part of the specification, serve to further illustrate various embodiments and to explain various principles and advantages all in accordance with the present invention.

DETAILED DESCRIPTION

The present invention provides a novel apron that can be worn by birds, for example, hens, to protect their backs from other birds, for example, roosters or predators. The inventive apron can be worn by both hens and roosters to prevent feather loss and cuts and gashes that can lead to picking, cannibalism and death, to cover areas of feather loss and wounds to promote healing and feather re-growth, and to provide protection against birds of prey by reducing their ability to grasp chickens. The apron is not limited to use on chickens and may be used on other poultry, such as ducks, turkeys and geese. The apron may also be used on other birds, such as parrots, for protection during mating, as a cape for warmth, or as a costume.

Figure 1:
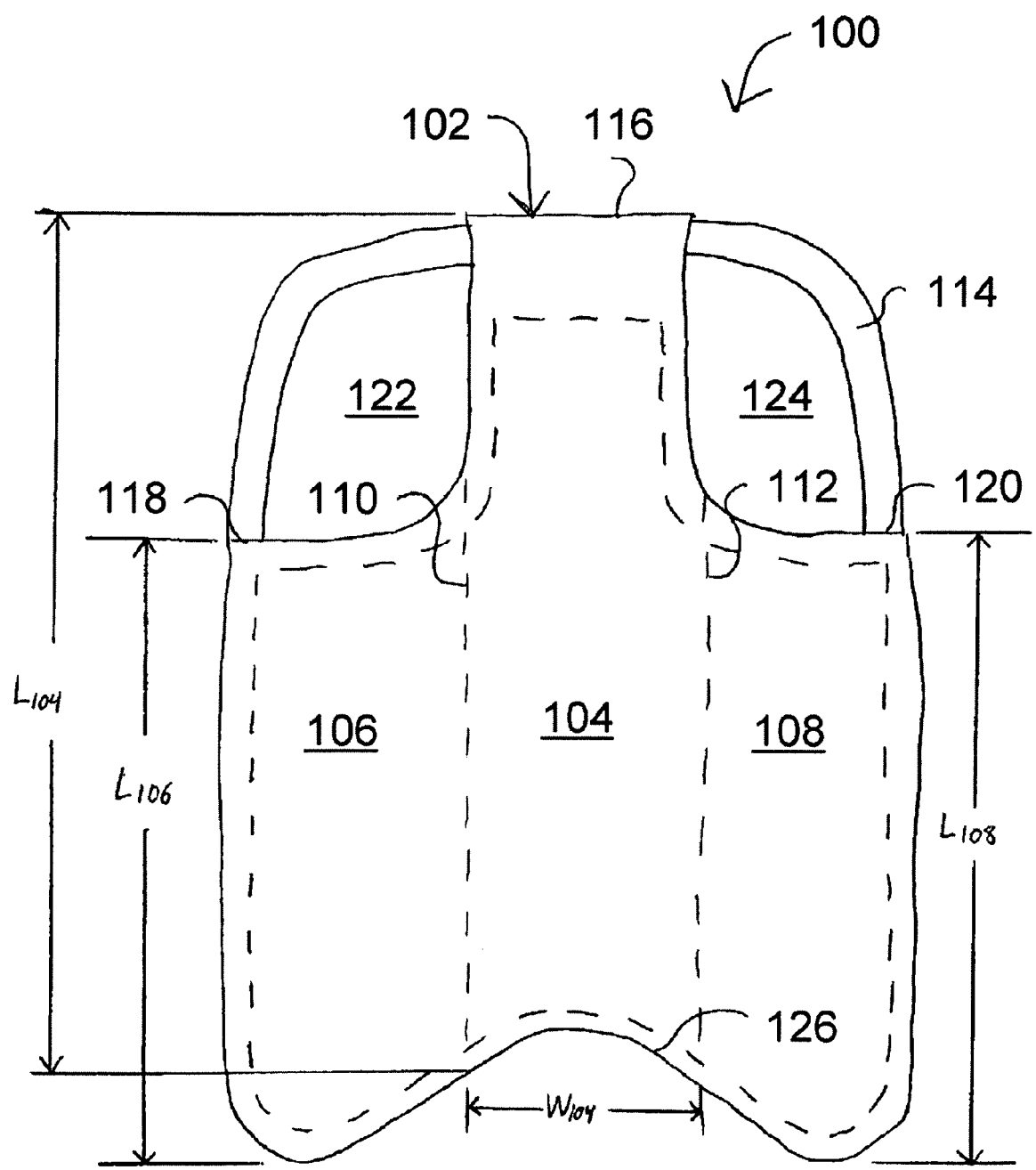
FIG. 1 is a planar view of a single-strap embodiment of a protective apron in accordance with the present invention.

Referring now to FIG. 1, one exemplary embodiment of the present invention is shown. FIG. 1 illustrates several advantageous features of the present invention, but, as will be described below, the invention can be provided in several shapes, sizes, combinations of features and components, and varying numbers and functions of the components. In this first embodiment of FIG. 1, the inventive apron 100 includes a back covering 102 shaped to cover the back of a bird. The back covering 102 has a main body area 104 with a length $L_{104}$ and a width $W_{104}$ and also includes a pair of opposing lateral sections 106 and 108, which are both attached to the main body area 104 at corresponding opposing edges 110 and 112 thereof. The edges 110 and 112 can be virtual edges and not physical boarders. Each of the opposing lateral sections 106, 108 has a length $L_{106}$, $L_{108}$, respectively, that is less than the length $L_{104}$ of the main body area 104 and a width dimensioned to extend beneath the a wing of the bird.

A securing strap 114 is coupled to an upper portion 116 of the main body area 104 and to an upper portion 118, 120 of each of the opposing lateral sections 106, 108, respectively. The main body area 104, the first lateral section 106 and the securing strap 114 define a first shoulder securing area 122 and the main body area 104, the second lateral section 108 and the securing strap 114 define a second shoulder securing area 124. The shoulder securing areas 122, 124 accept a bird's shoulder and secure the apron 100 to the bird. Once placed on the bird, the wings of the bird cover the opposing lateral sections 106, 108 and retain the apron 100 against the bird's back. In addition, the back covering 102 has a substantially V-shaped lower edge 126 that accommodates the bird's tail feathers.

Figure 2:
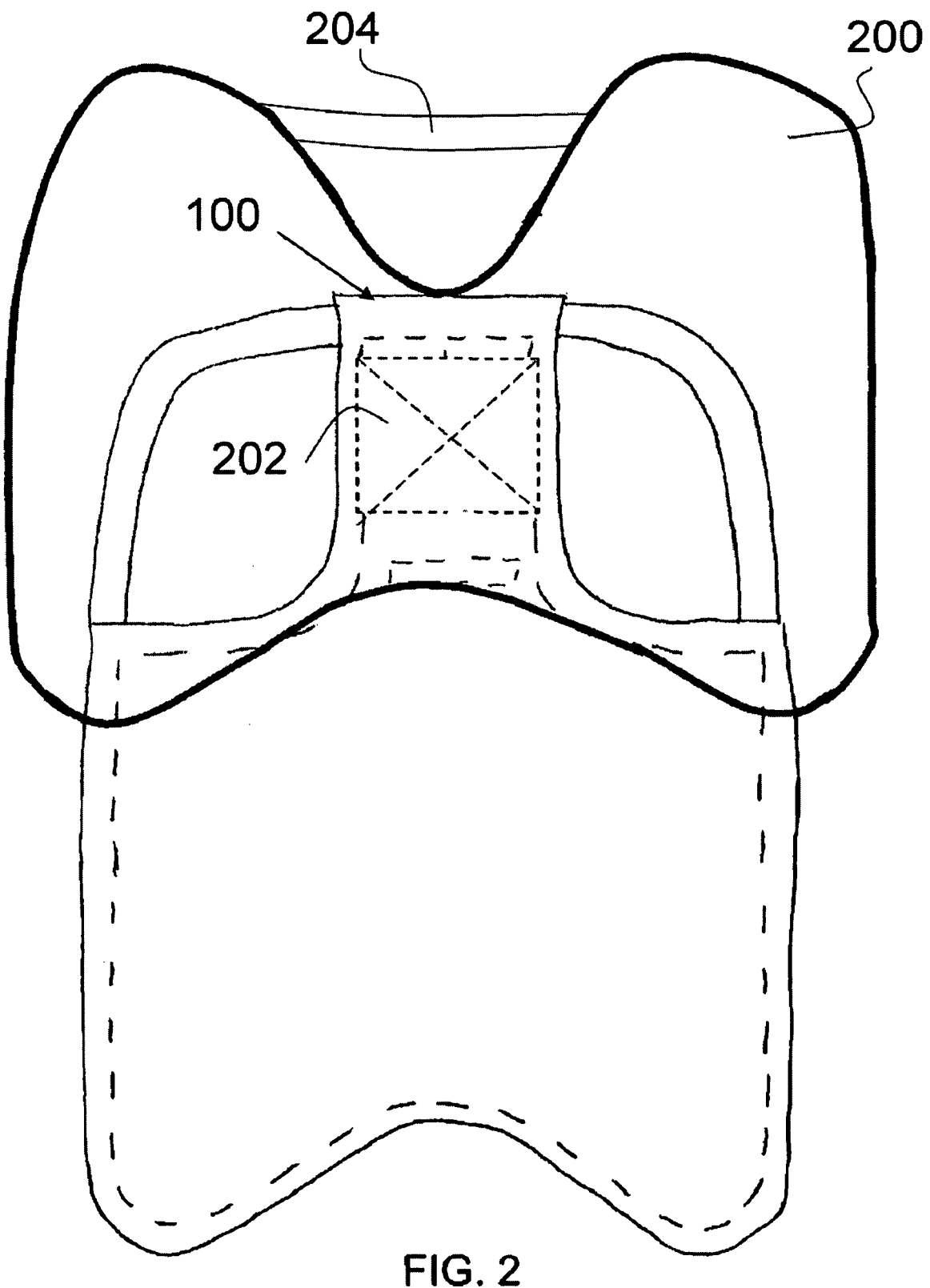
FIG. 2 is a planar view a protective shoulder cover in accordance with the present invention attached to the protective apron of FIG. 1.

FIG. 2 shows an additional feature of the present invention, which provides a shoulder protector 200 that covers and protects the shoulders of the bird. The shoulder protector 200 can be fixedly coupled to the back covering 102 or removably attached thereto. The shoulder protector 200, according to one embodiment, has a width substantially the same or greater than the width of the back covering 102.

In one embodiment where the shoulder protector 200 is removably attached, the main body area 104 can be provided with one or more couples 202, which allow the shoulder protector 200 to securely attach to the back covering 102. The couples can be, for instance, VELCRO, snap fasteners, hook and loop closures, zippers, buttons, tacky tape, lacing and many more. Where the shoulder protector 200 is non-removably attached, sewing, gluing, taping, and many others may be used. One benefit of the removable shoulder protector 200 is that it can be placed or removed as seen fit by the chicken's caretaker. Caretakers may wish to remove the shoulder protectors in hot weather, rain, or during setting, for example. An additional benefit of a removable protector 200 is that a single hen apron can be re-used by other chickens and the protector used on those chickens prone to shoulder damage but not used on other chickens not prone to suffering such shoulder damage.

Figure 3:
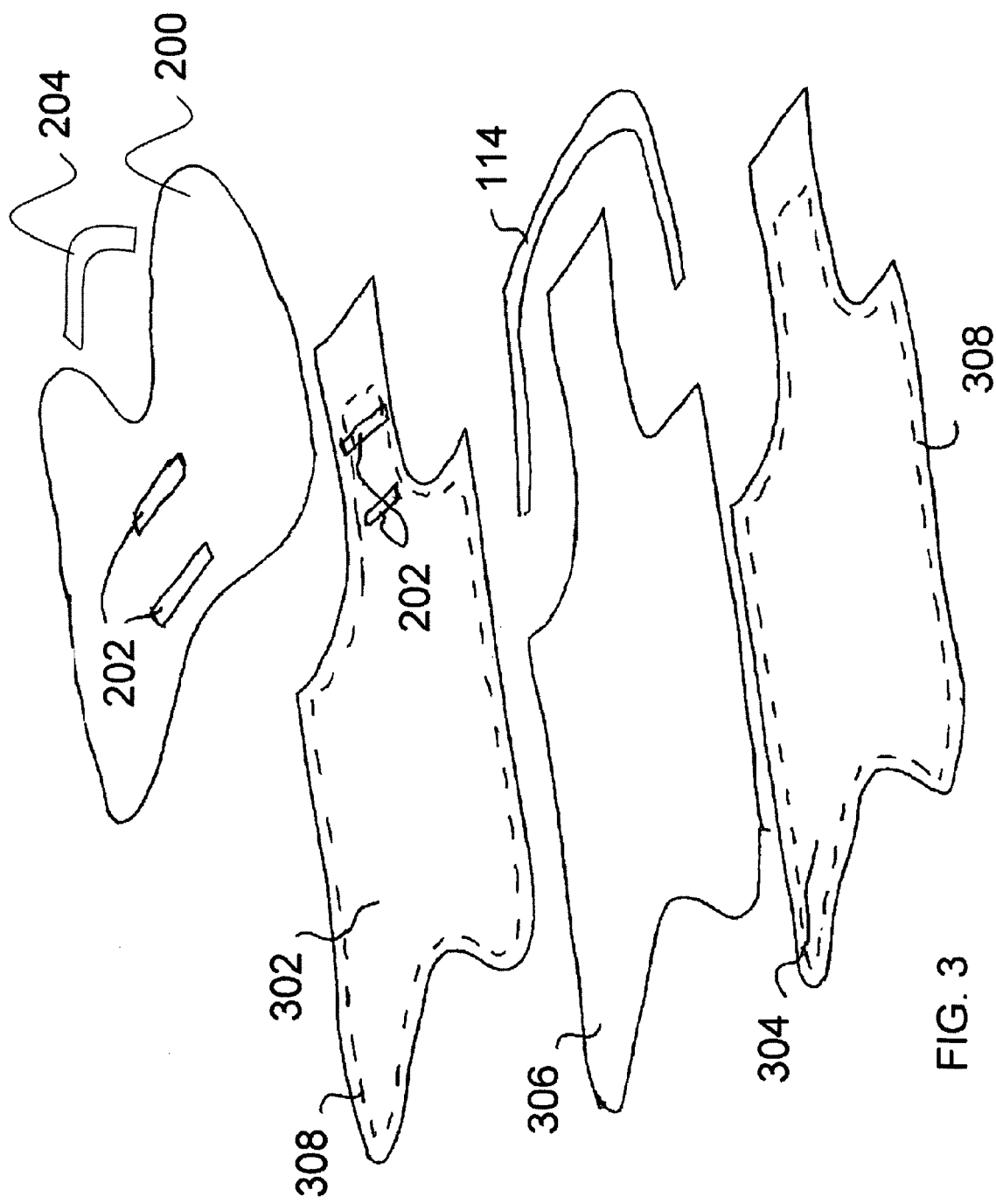
FIG. 3 is an exploded perspective view of the apron assembly and shoulder cover of FIG. 2.

Also shown in FIG. 3 is a strap 204 that goes around the bird's neck and secures the shoulder protector 200 to the bird. The strap 204 ensures that the upper edges of the shoulder protector will stay in place and against the bird.

As shown in FIG. 3, the protective back covering 102 can be multi-layer and constructed, for instance, from a top layer 302 and bottom interior layer 304 of various rip, tear, and puncture-resistant materials, such as but not limited to denim, canvas duck, leather, Kevlar and nylon. The interior layer 304 can be of a different material than the first layer 302. The back covering 102 can be filled with a layer of batting 306 that can be made of various breathable materials, such as cotton. The batting 306 is secured to the top 302 and bottom 304 layers of the back covering 102 with a finished seam 308.

The securing strap 114 can be of various materials, such as, but not limited to, elastic, cloth, leather, denim, other sufficiently resilient material. Similarly, the shoulder protector 200 can be made of various materials, such as, but not limited to, denim, canvas duck, leather, Kevlar and nylon.

The securing strap 114 can be sewn onto the covering 102, but can be, alternatively, secured with various methods other than sewing, such as, but not limited to, snap fasteners, buttons, hook and loop closures, and others.

Figure 4:
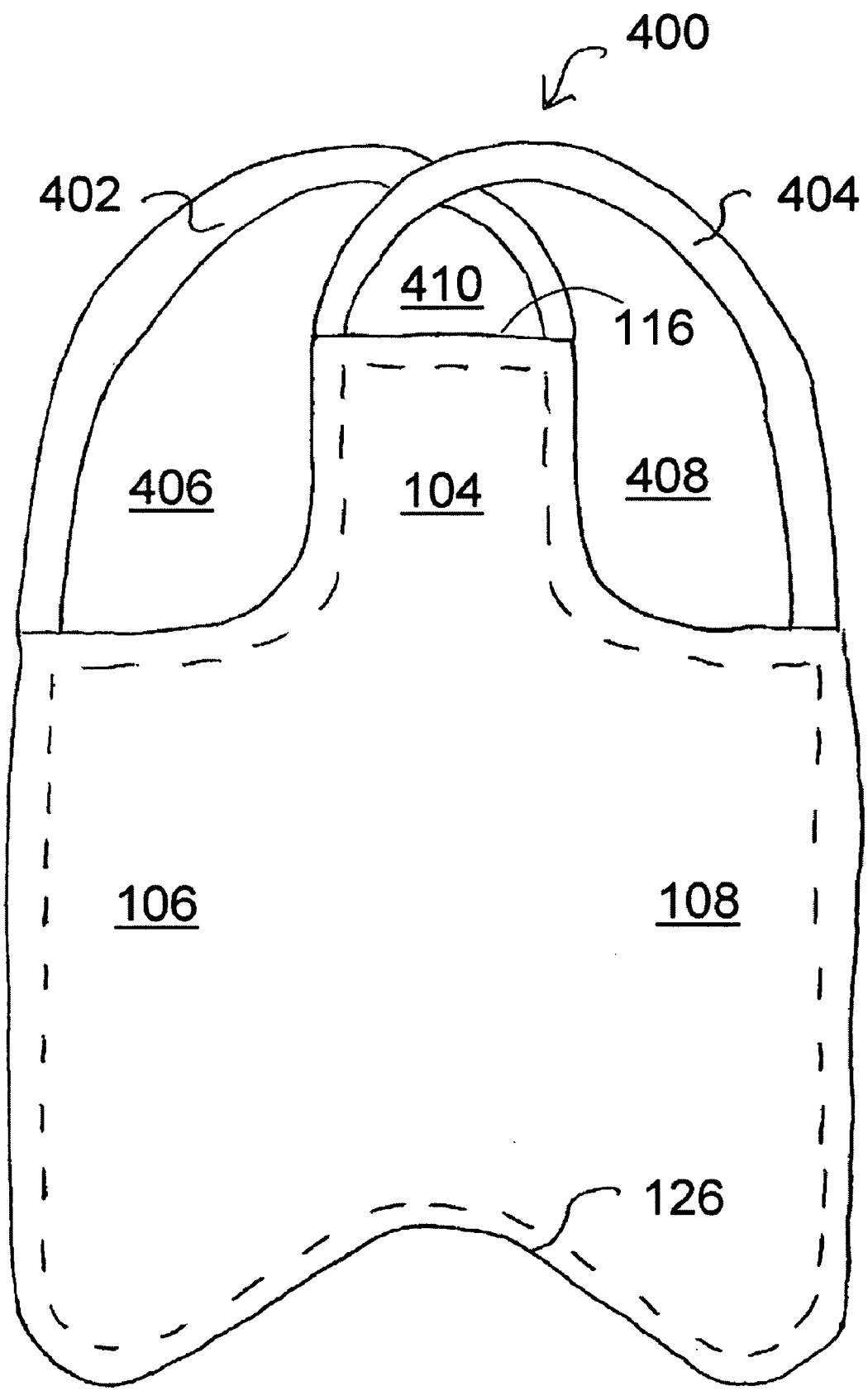
FIG. 4 is a planar view of a dual-strap embodiment of a protective apron in accordance with the present invention.

The apron 100, in addition to being able to be secured to a hen with the single securing strap 114, can also be secured with a dual-strap embodiment, as shown in FIG. 4. In this embodiment, two straps 402 and 404 originate on outer portions of the opposing lateral sections 106 and 108, respectively, and attach on either side of the upper portion 116 of the main body area 104 opposite one another. This dual-strap embodiment, defines a first wing capturing portion 406, a second wing capturing portion 408, and a neck-securing loop 410 that crosses under the hen's neck.

Although both the single-strap embodiment of FIG. 1 and the dual-strap embodiment of FIG. 4 are useful for all birds, the single-strap style is advantageous for less active birds, such as cooped, confined, pet, or show chickens. The single-strap apron is secured to the chicken by pulling the chicken's wings through the two shoulder securing areas 122 and 124 that are formed, one on each side of the main body area 104, by the single securing strap 114 and the upper portion 116 of the apron. There is no strap around the chicken's neck in this style. The two-strap embodiment 400 of FIG. 4 is advantageous for more active free-ranging and commercial chickens. The two-strap apron 400 is secured to the chicken by pulling the apron over the chicken's head and down onto the chicken's neck so that the chicken's head is inserted through the loop 410 made by the crossing-over of the two straps 402 and 404 and then pulling the chicken's wings through the two strap loops 406 and 408, one on each side of the apron. The straps cross under the chicken's neck in this style. Either style can be made with or without a shoulder protector 200, whether permanent or removable. In both embodiments, the fabric of the shoulder protector covers and protects the chicken's shoulders. Both embodiments can be constructed in a variety of sizes to fit birds of various sizes and in a variety of fabric colors and patterns. If desired, the colors and/or patterns can be used to identify particular birds easily and quickly, especially in low visibility situations.

Both strap styles of aprons 100 and 400 and variations (with or without shoulder protectors) of this invention permit the chicken to move as freely as it would if it was not wearing the apron. Chickens wearing the presently inventive apron can fly, jump, take dirt baths, free-range, run, walk, perch, set and lay eggs.

Both apron embodiments 100, 400 feature a V-shaped notch 126 to accommodate the chicken's tail feathers. The width of the apron is such that it covers the areas of the chicken's back and sides most likely to be grasped by a bird of prey. The construction of the apron, with three-layers 302, 304, 306 of puncture-resistant material combined with a finished-seam 308 that secures the inner layer 306 of material around the perimeter of the body, encourages the body to fold laterally and lift upwards when grasped and squeezed by bird of prey's talons. This embodiment is conducive to use on parrots and other psittacines as an apron, cape, or costume.

The shoulder protector 200, shown in FIG. 2 is useful with both the single-strap embodiment of the apron 100 and the dual strap embodiment of the apron 400. The shoulder protector 200 can also be constructed of a multi-layer material and is intended to cover the bird's shoulders without inhibiting the bird's ability to move her wings, dust bathe, or fly. Advantageously, the present invention protectively covers the bird without inhibiting the bird's ability to fly and escape predators, take dust baths, remove mites and lice, and much more.

An apron 100, 400 and protective shoulder cover 200 has been disclosed that may be used on both liens and roosters. The apron 100, 400 provides an effective barrier between the chicken's back (and shoulders with shoulder protector 200) and the beak and nails of other chickens. It also provides an effective barrier against the areas of the back most likely to be grasped by the talons of an attacking bird of prey. The hen apron 100, 400 covers the most common areas of contact between predatory birds' talons and the chickens' backs and sides, as determined from study of carcasses of chickens killed by birds of prey. The apron 100, 400 is also prone to flex laterally and lift upwards when grasped, thereby limiting the ability of the bird to gain purchase of the chicken and potentially enabling the chicken to escape the hawk's grasp.

What is claimed is:

1. A protective bird apron comprising:
    a back covering shaped to cover a back of a bird, the back covering having:
        a main body area having a length and a width;
        a first lateral section attached to a first side of the main body area and having a length less than the length of the main body area and a width dimensioned to extend away from the main body area and beneath a first wing of the bird; and
        a second lateral section attached to a second side of the main body area opposite the first side and having a length less than the length of the main body area and a width dimensioned to extend away from the main body area and beneath a second wing of the bird;
    a first securing strap coupled to an outer portion of the first lateral section and to the second side of the main body area;
    a second securing strap coupled to an outer portion of the second lateral section and to the first side of the main body area, the first and second securing straps defining a first wing capturing portion, a second wing capturing portion, and a neck capturing portion; and
    a shoulder protector having:
        a first attachment area and a first-wing-covering portion, the first-wing-covering portion being coupled only by the first attachment area and to the main body area of the back covering, thereby leaving the first-wing-covering portion unrestricted in wing-flapping movement at a location above the first wing of the bird; and
        a second attachment area and a second-wing-covering portion, the second-wing-covering portion being coupled only by the second attachment area and to the main body area of the back covering, thereby leaving the second-wing-covering portion unrestricted in wing-flapping movement at a location above the second wing of the bird,
    the shoulder protector disposed to protect shoulders of the bird and having a width substantially the same or greater than a width of the back covering.

2. The protective bird apron according to claim 1, wherein:
    the shoulder protector is removably coupled to the back covering.

3. The protective bird apron according to claim 1, wherein the shoulder protector further comprises:
    a neck-securing loop shaped to secure the shoulder protector to a neck of the bird.

4. The protective bird apron according to claim 1, wherein the shoulder protector further comprises:
    a substantially V-shaped lower edge.

5. The protective bird apron according to claim 1, wherein the back covering is of a first material and further comprises:
    an interior layer insulating the back covering from the bird, the interior layer being of a second material different from the first material.

6. The protective bird apron according to claim 5, further comprising:
    an inner layer disposed between the interior layer and the bird.

7. The protective bird apron according to claim 1, wherein the back covering further comprises:
    a substantially V-shaped lower edge shaped to accept a tail of the bird.

8. A protective bird apron comprising:
    a back covering shaped to cover a back of a bird, the back covering having:
        a main body area having a length and a width; and
        a pair of opposing lateral sections attached to the main body area at corresponding opposing edges thereof, each lateral section having a length less than the length of the main body area and a width dimensioned to extend beneath respective wings of the bird;
    at least one securing strap coupled to an upper portion of the main body area and to an upper portion of at least one of the lateral sections, the main body area, the at least one of the lateral sections, and the at least one securing strap defining at least one shoulder securing area; and
    a shoulder protector having:
        a first attachment area and a first-wing-covering portion, the first-wing-covering portion being coupled only by the first attachment area and to the main body area of the back covering, thereby leaving the first-wing-covering portion unrestricted in wing-flapping movement at a location above the first wing of the bird; and a second attachment area and a second-wing-covering portion, the second-wing-covering portion being coupled only by the second attachment area and to the main body area of the back covering, thereby leaving the second-wing-covering portion unrestricted in wing-flapping movement at a location above the second wing of the bird, the shoulder protector disposed to protect shoulders of the bird and having a width substantially the same or greater than a width of the back covering.

9. The protective bird apron according to claim 8, wherein: the shoulder protector is removably coupled to the back covering.

10. The protective bird apron according to claim 8, wherein the shoulder protector further comprises:

a neck-securing loop shaped to secure the shoulder protector to a neck of the bird.

11. The protective bird apron according to claim 8, wherein the shoulder protector further comprises:

a substantially V-shaped lower edge.

12. The protective bird apron according to claim 8, further comprising:

the back covering being of a first material; and an interior layer insulating the back covering from the bird, the interior layer being of a second material different from the first material.

13. The protective bird apron according to claim 12, further comprising:

an inner layer disposed between the interior layer and the bird.

14. The protective bird apron according to claim 8, wherein the back covering further comprises:

a substantially V-shaped lower edge shaped to accept a tail of the bird.

* * * * *